(12) United States Patent
Tanikawa

(10) Patent No.: US 10,620,476 B2
(45) Date of Patent: Apr. 14, 2020

(54) IMAGE DISPLAY APPARATUS

(71) Applicant: Panasonic Intellectual Property Management Co., Ltd., Osaka (JP)

(72) Inventor: Toru Tanikawa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/094,379

(22) PCT Filed: Feb. 6, 2018

(86) PCT No.: PCT/JP2018/004005
§ 371 (c)(1),
(2) Date: Oct. 17, 2018

(87) PCT Pub. No.: WO2018/147274
PCT Pub. Date: Aug. 16, 2018

(65) Prior Publication Data
US 2019/0146279 A1 May 16, 2019

Related U.S. Application Data

(60) Provisional application No. 62/456,931, filed on Feb. 9, 2017.

(30) Foreign Application Priority Data
Aug. 24, 2017 (JP) ................................ 2017-161505

(51) Int. Cl.
*G02F 1/1335* (2006.01)

(52) U.S. Cl.
CPC .. *G02F 1/133611* (2013.01); *G02F 1/133605* (2013.01); *G02F 1/133608* (2013.01);
(Continued)

(58) Field of Classification Search
CPC ........ G02F 1/133611; G02F 1/133606; G02F 1/133603
(Continued)

(56) References Cited

U.S. PATENT DOCUMENTS

| 2008/0042555 A1* | 2/2008 | Ko ..................... G02F 1/133603 313/503 |
| 2008/0198296 A1* | 8/2008 | Chu .................. G02F 1/133603 349/64 |

(Continued)

FOREIGN PATENT DOCUMENTS

| JP | 2011-151002 A | 8/2011 |
| JP | 2015-176780 A | 10/2015 |

OTHER PUBLICATIONS

International Search Report issued in Application No. PCT/JP2018/004005 dated Apr. 24, 2018, with English translation.

*Primary Examiner* — Christopher M Raabe
(74) *Attorney, Agent, or Firm* — McDermott Will & Emery LLP

(57) ABSTRACT

An image display apparatus includes: a display panel; a back frame including a flat portion having a substantially flat surface; light sources spaced substantially evenly apart in the flat portion; and a luminance-equalizing sheet supported at a distance from the light sources by support pins. The luminance-equalizing sheet includes through holes that transmit light from the light sources toward the display panel. The through holes are arranged in a predetermined pattern applied to blocks that are arranged in an array in the luminance-equalizing sheet and each of which faces a different one of the light sources. The predetermined pattern includes a first pattern and a second pattern. The first pattern is applied to at least some of outer blocks in contact with a periphery of the array, and the second pattern is applied to
(Continued)

at least some of the blocks to which the first pattern is not applied.

7 Claims, 6 Drawing Sheets

(52) U.S. Cl.
CPC .. *G02F 1/133603* (2013.01); *G02F 1/133606* (2013.01); *G02F 2001/133612* (2013.01)

(58) Field of Classification Search
USPC .................................................... 362/97.2
See application file for complete search history.

(56) References Cited

U.S. PATENT DOCUMENTS

| | | | | |
|---|---|---|---|---|
| 2008/0284942 | A1* | 11/2008 | Mahama | G02B 6/0073 349/64 |
| 2011/0285923 | A1* | 11/2011 | Yokota | F21V 19/009 348/739 |
| 2012/0169791 | A1* | 7/2012 | Whitehead | G02F 1/133603 345/690 |
| 2012/0268688 | A1 | 10/2012 | Sato et al. | |
| 2015/0029698 | A1* | 1/2015 | Huang | G02F 1/133603 362/97.1 |
| 2015/0261042 | A1 | 9/2015 | Sugaya | |
| 2016/0061414 | A1* | 3/2016 | Song | G02F 1/133603 362/97.1 |
| 2016/0077381 | A1* | 3/2016 | Ma | G02F 1/133606 362/97.1 |
| 2017/0160591 | A1* | 6/2017 | Cho | G02B 5/0257 |

\* cited by examiner

IMAGE DISPLAY APPARATUS

RELATED APPLICATIONS

This application is the U.S. National Phase under 35 U.S.C. § 371 of International Application No. PCT/JP2018/004005, filed on Feb. 6, 2018, which claims the benefit of Japanese Application No. 2017-161505, filed on Aug. 24, 2017, and which claims the benefit of U.S. Provisional Application 62/456931, filed Feb. 9, 2017, the disclosures of which Applications are incorporated by reference herein.

TECHNICAL FIELD

The present disclosure relates to image display apparatuses including a display panel such as a liquid crystal cell.

BACKGROUND ART

Patent Literature (PTL) 1 discloses a display apparatus including, as a direct-lit backlight, a surface light source unit including a light-transmissive reflector for providing uniform surface illumination light having less luminance unevenness.

CITATION LIST

Patent Literature

PTL 1: Japanese Unexamined Patent Application Publication No. 2011-151002

SUMMARY OF THE INVENTION

Technical Problem

The present disclosure provides an image display apparatus that is capable of displaying an image with greater luminance uniformity throughout a screen.

Solution to Problem

An image display apparatus according to the present disclosure includes: a display panel; a back frame that includes a flat portion having a substantially flat surface facing an active area of the display panel; a plurality of light sources that are spaced substantially evenly apart in the flat portion; and a luminance-equalizing sheet that is sheet-shaped and supported at a distance from the plurality of light sources by a plurality of support pins that are pillarshaped and spaced substantially evenly apart in the flat portion. The luminance-equalizing sheet includes a plurality of through holes that transmit light from the plurality of light sources toward the display panel. The plurality of through holes are arranged in a predetermined pattern that is applied to blocks that are arranged in an array in the luminance-equalizing sheet and each of which faces a different one of the plurality of light sources. The predetermined pattern includes a first pattern and a second pattern, the first pattern being applied to at least some of outer blocks, among the blocks, that are in contact with a periphery of the array, the second pattern being different from the first pattern and applied to at least some of the blocks to which the first pattern is not applied.

ADVANTAGEOUS EFFECT OF INVENTION

An image display apparatus in the present disclosure is capable of displaying an image with greater luminance uniformity throughout a screen.

DESCRIPTION OF EXEMPLARY EMBODIMENT

Figure 1:
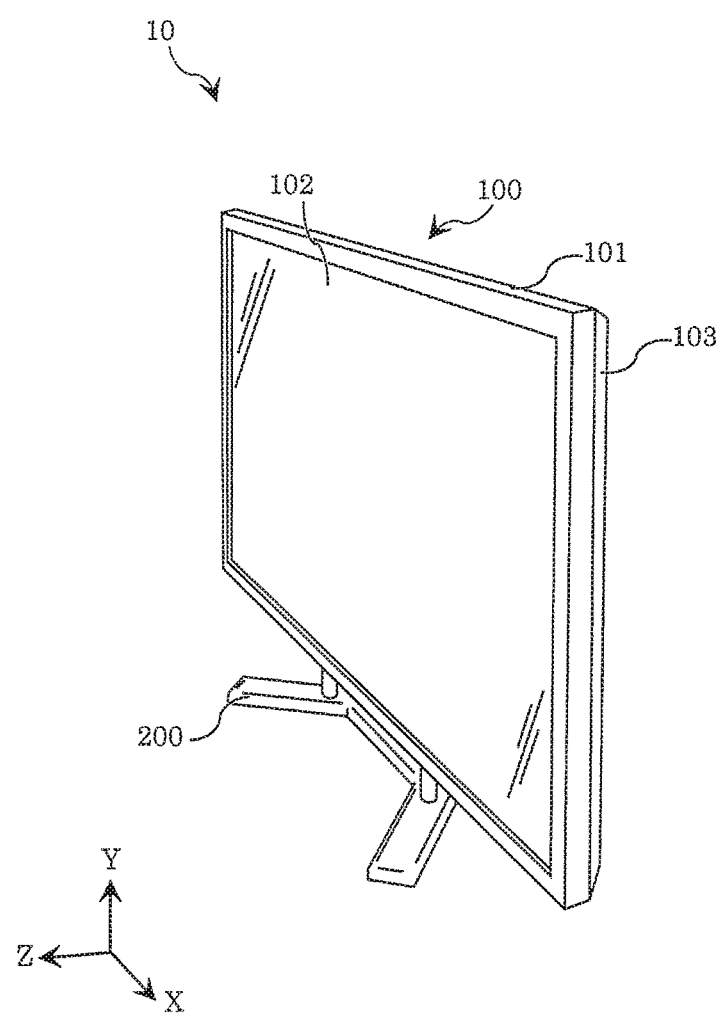
FIG. 1 is an external perspective view of a liquid crystal television according to an embodiment.

The inventors have found the following problem regarding conventional image display apparatuses.

In image display apparatuses such as conventional liquid crystal televisions, a display module circumferentially including a display panel is roughly a rectangular parallelepiped that is thin from front to back, and, to be more exact, has a shape with relatively broadly chamfered four sides on the back side of the display module. Such a shape of the display module in which the thickness is small at its end face produces a visual effect of making the display module itself look thinner than it is.

The display module having such a shape is smaller in thickness in a peripheral portion than in the other portions.

In such image display apparatuses, however, the peripheral portion of the display panel cannot employ a display mechanism common to the other portions due to limitations of internal space in a thickness direction. For this reason, it is difficult to achieve uniform image quality throughout a screen. To give a specific example, in an image display apparatus using a direct-lit backlight system, since incident light includes reflected light from an inclined surface relative to an incidence surface, blocks that are mainly illuminated by, among light sources, light sources in the outermost of the display panel receive a less amount of light than other blocks. Further, such blocks have no adjacent blocks illuminated by light sources across the ends of the display panel. Accordingly, unlike blocks that are further inside the display panel and light enters also from adjacent blocks in all directions, the blocks in the outermost of the display panel cannot easily achieve high luminance in the vicinity of the ends of the display panel as much as in the other part of the respective blocks. In other words, in the vicinity of the ends of the screen, a decrease in luminance toward the ends of the screen, that is, luminance unevenness occurs.

It should be noted that similar luminance unevenness can occur even in a display module having a shape similar to a thin rectangular parallelepiped, not a shape that produces the above effect of making the display module look thin. In such an image display apparatus, luminance unevenness is reduced to some degree by back frame shape design or print on a reflective sheet or a diffuser panel. As stated above, however, the restriction of the shape of a back frame for making the display module look thin makes differences in amount of light from adjacent blocks complex among blocks in the display panel, and luminance unevenness cannot be easily reduced by print on a reflective sheet etc.

The present disclosure has been made based on such an underlying knowledge, and the inventors have arrived at a concept for the structure of an image display apparatus that is capable of displaying an image with greater luminance uniformity throughout a screen.

Hereinafter, an embodiment will be described with reference to the drawings appropriately. However, unnecessarily detailed descriptions may be omitted. For example, detailed description of well known matter or repeated description of essentially similar elements may be omitted. This is to avoid unnecessary redundancy and provide easily read descriptions for those skilled in the art.

It should be noted that the inventors have provided the accompanying drawings and following description in order to facilitate sufficient understanding of the present disclosure by those skilled in the art, and thus are not intended to limit the subject matter of the claims.

Prior to describing the embodiment with reference to the drawings using, as an example, an image display apparatus that is a liquid crystal television, an outline of the structure of the image display apparatus relating to both the embodiment and a variation will be described below. Differences between embodiments will be described later.

Further, for convenience of explanation, an up-down direction, a front-back direction, and a left-right direction of the image display apparatus correspond to the Y axis direction, the Z axis direction, and the X axis direction, respectively, in the following embodiment. It should be noted that these directional correspondences do not limit the orientation of the image display apparatus according to the present disclosure at the time of manufacture or use.

(Outline Configuration of Image Display Apparatus)

Figure 2:
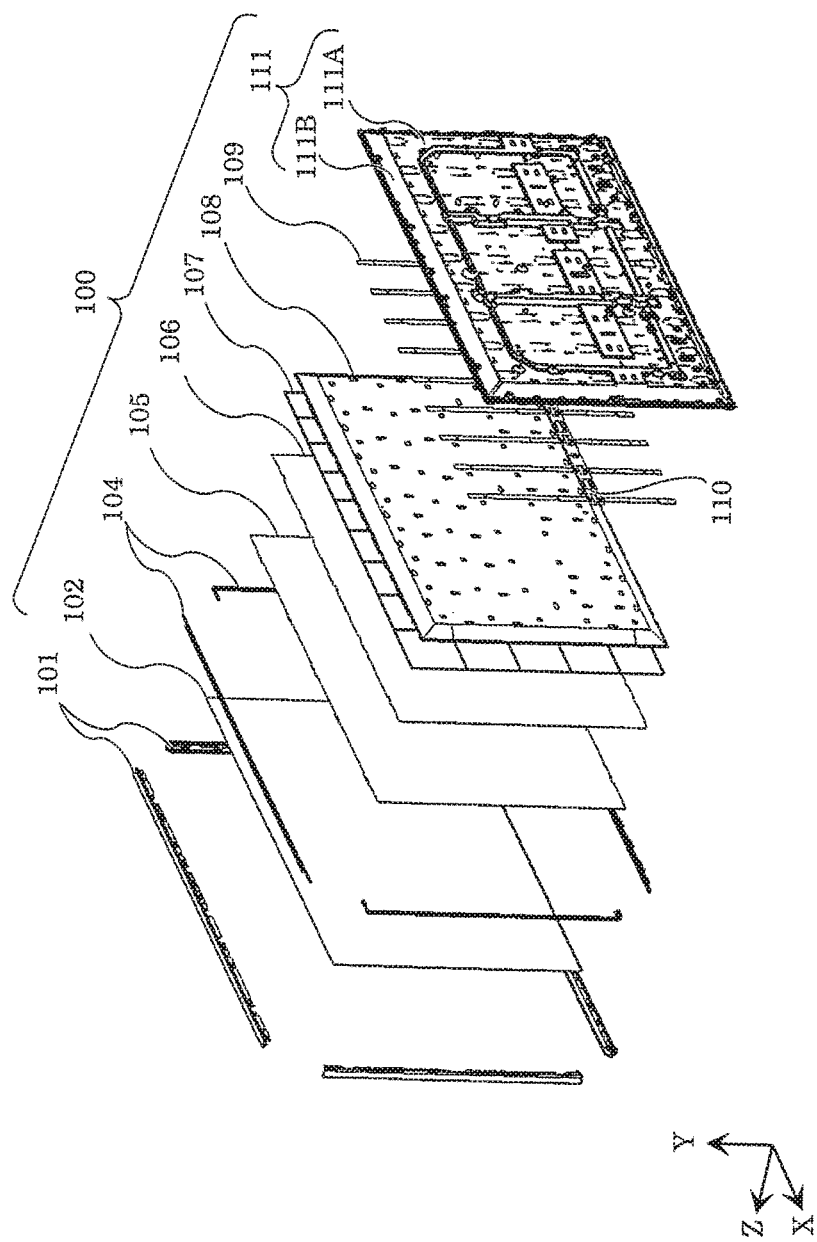
FIG. 2 is an exploded perspective view of a liquid crystal module according to the embodiment.
Figure 3:
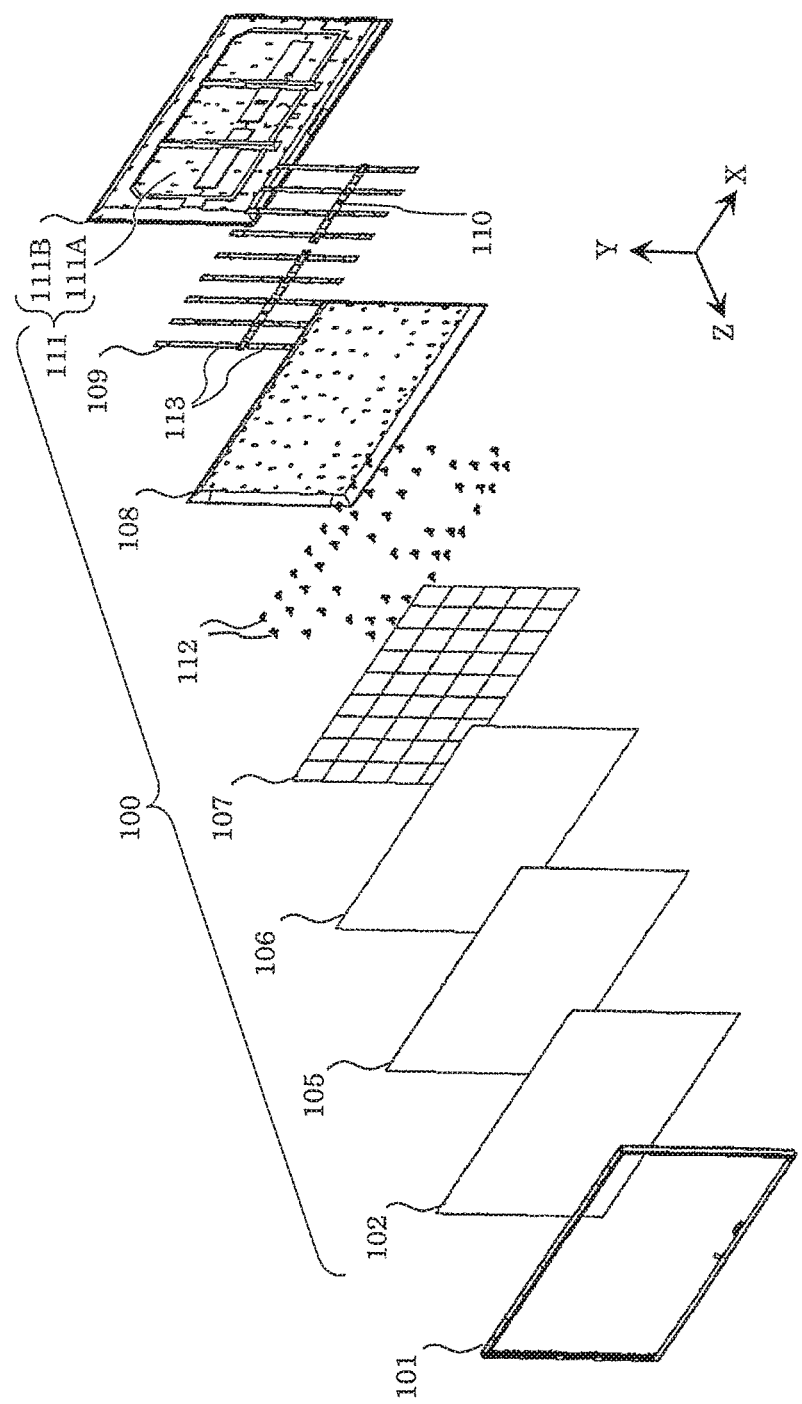
FIG. 3 is an exploded perspective view of the liquid crystal module according to the embodiment.

FIG. 1 is an external perspective view of image display apparatus 10 according to an embodiment. FIGS. 2 and 3 each are an exploded perspective view of liquid crystal module 100 according to the embodiment.

Image display apparatus 10 is, for example, a liquid crystal television. As shown in FIG. 1, image display apparatus 10 includes liquid crystal module 100, bezel 101, back cover 103, and stand 200.

Liquid crystal module 100 is an image display module capable of displaying still and moving images, and includes display panel 102.

In the embodiment to be described below, display panel 102 is what is called a liquid crystal cell, and is a component in which liquid crystals are sealed between glass substrates. Display panel 102 is controlled according to an image signal inputted to image display apparatus 10 and thereby displays images.

Liquid crystal module 100 can stand on a floor or table with stand 200. However, the usage mode of liquid crystal module 100 is not limited to this. For example, liquid crystal module 100 may be hung on a wall, embedded in a wall, or suspended from a ceiling with other fittings instead of stand 200, for use as image display apparatus 10.

Bezel 101 made of a resin is formed of parts corresponding to the respective four sides of image display apparatus 10, and the parts are joined to each other by, for example, screws. Bezel 101 and back cover 103 clamp together components therebetween, from display panel 102 to back frame 111, which will be described below.

As shown in FIGS. 2 or 3, liquid crystal module 100 having the above configuration further includes molded frame 104, optical sheet unit 105, diffuser panel 106, luminance-equalizing sheet 107, reflective sheet 108, LED sheet 109, relay sheet 110, back frame 111, and support pins 112.

Molded frame 104 and back frame 111 clamp together components (what is called a back light unit) therebetween, from optical sheet unit 105 to LED sheet 109 and relay sheet 110. It should be noted that FIG. 3 omits molded frame 104.

Optical sheet unit 105 is configured by stacking two or three types of sheets having different optical properties. For example, optical sheet unit 105 includes a vertical prism sheet, a horizontal prism sheet, and a diffuser sheet.

Diffuser panel 106 diffusely emits, toward display panel 102, incident light from light-emitting diodes (LEDs) 113 that are disposed on LED sheet 109 and serve as light sources of image display apparatus 10.

Luminance-equalizing sheet 107 increases a degree of uniformity of luminances of light (hereinafter also referred to as emitted light) from LEDs 113 on LED sheet 109 that differ from place to place, and transmits the light toward diffuser panel 106 and display panel 102. Luminance-equalizing sheet 107 is, for example, a sheet-shaped component that is made of a resin such as polyethylene terephthalate (PET) densely containing microscopic bubbles and has satisfactory light reflecting properties.

There are multiple through holes across substantially entire luminance-equalizing sheet 107. Part of emitted light from LEDs 113 passes through the through holes to an opposite side, that is, the side where diffuser panel 106 is present (also expressed as "light passes through luminance-equalizing sheet 107" in the present disclosure). The number, size, or distribution of the through holes is adjusted so that luminance-equalizing sheet 107 substantially equalizes amounts of transmission of light per unit area from light sources spaced apart at predetermined positions. In other words, not all of the through holes across luminance-equalizing sheet 107 are evenly sized or evenly distributed. Such through holes are arranged in predetermined patterns applied to respective blocks that are arranged in an array in luminance-equalizing sheet 107 and each of which faces a different one of LEDs 113. Luminance-equalizing sheet 107 is manufactured by, for example, making holes through the above resin sheet having a predetermined size according to such patterns, using a die.

It should be noted that cells on luminance-equalizing sheet 107 shown in FIGS. 2 and 3 indicate such blocks. However, lines dividing luminance-equalizing sheet 107 into the cells are virtual lines, and such lines are not present in reality. The same applies to the following figures. Predetermined patterns will be described in the embodiment.

This configuration smoothes the distribution characteristics (hereinafter also referred to as light distribution characteristics) of light emitted by LEDs 113. The light from LEDs 113, of which the light distribution characteristics are smoothed by luminance-equalizing sheet 107, is diffused by diffuser panel 106 so that luminance unevenness is further reduced, and is emitted toward display panel 102.

Reflective sheet 108 includes holes that correspond in location and size to respective LEDs 113 on LED sheet 109, and reflects light at the entire surface on a side facing a front surface of display apparatus 10. Reflective sheet 108 includes: a flat portion that faces an active area of display panel 102 and has a substantially flat surface smaller than the active area; and a side wall that rises from the ends of the four sides of the flat portion and reaches the outer edge of the active area of display panel 102 in a front view of display apparatus 10. Reflective sheet 108 as a whole is substantially shaped to conform to back frame 111 to be described later.

LED sheet 109 is a flexible printed board (hereinafter referred to as flexible printed circuits (FPCs)) on which LEDs 113 are mounted. LEDs 113 are mounted on one of two principal surfaces of the FPCs that are sheet-shaped, and a reflective layer that reflects light is disposed on the principal surface of the FPCs on which LEDs 113 are mounted, that is, the principal surface on the front side of display apparatus 10. Further, LEDs 113 on the principal surface of LED sheet 109 are spaced substantially equally, for example, in a matrix so that LEDs 113 can illuminate as wide an area of the back surface of display panel 102 as possible while reducing unevenness depending on a location as much as possible.

Relay sheet 110 is FPCs on which electrical paths for transmitting power, a control signal, or the like to each of LEDs 113 on LED sheet 109 are disposed. Further, like LED sheet 109, a reflective layer is disposed on a principal surface of relay sheet 110 on the front side of image display apparatus 10.

Back frame 111, also referred to as a base plate, is a plate-shaped component made of a metal plate, and supports LED sheet 109 and relay sheet 110. Back frame 111 includes: flat portion 111A facing an active area of display panel 102 and having a substantially flat surface smaller than the active area; and side wall 111B that rises from the outer edge of flat portion 111A, that is, the ends of the four sides, and reaches the outer edge of the active area of display panel 102 when image display apparatus 10 is seen from the front side (a side on which display panel 102 is present). Since back cover 103 is shaped to conform to the external shape of back frame 111, liquid crystal module 100 produces the above-described effect of making liquid crystal module 100 look thin in outward appearance due to the shape with the relatively broadly chamfered four sides on the back side of the rectangular parallelpiped that is thin from front to back (along the Z axis).

It should be noted that in order to increase luminance uniformity on the entire active area of display panel 102, a configuration to be described in the following is applicable to a liquid crystal module having a configuration that does not produce the above-described effect and including a back frame and a reflective sheet.

LEDs 113, which serve as the light sources, are disposed in flat portion 111A of back frame 111. More specifically, LED sheet 109 on which LEDs 113 are spaced substantially equally and relay sheet 110 are attached to flat portion 111A. Subsequently, reflective sheet 108 is further affixed to flat portion 111A so that LEDs 113 are exposed from the respective holes of reflective sheet 108. Emitted light from each LED 113 is directly incident on luminance-equalizing sheet 107 on the front side of image display apparatus 10, or is reflected by the reflective layer on the FPCs and reflective sheet 108 and then incident on luminance-equalizing sheet 107. Back frame 111 and molded frame 104 clamp together the back light unit therebetween, from optical sheet unit 105 to LED sheet 109 and relay sheet 110.

Back frame 111 may further include a configuration for supporting each component of the back light unit. For example, back frame 111 may include a cut and raised portion for hanging optical sheet unit 105, in the neighborhood of one side that is on the top side when image display apparatus 10 is placed for use. In this case, optical sheet unit 105 includes, for example, a tab having a hole for hooking on the cut and raised portion.

Support pins 112 shown in FIG. 3 are pillar-shaped components. Each of support pins 112 includes: an end to be attached to back frame 111; tip 112A that is an end opposite to the end; and flange 112B that is flanged and at a longitudinally intermediate position on the pillar shape.

Support pins 112 are attached to flat portion 111A of back frame 111 with reflective sheet 108 in between, and support pins 112 and back frame 111 clamp together reflective sheet 108.

Figure 4:
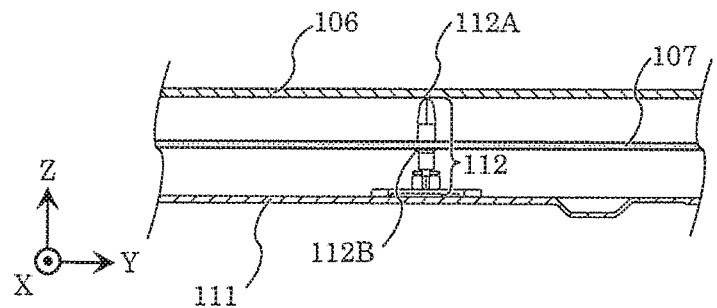
FIG. 4 is a schematic cross-sectional view of a state in which a support pin is installed in the liquid crystal module.

In addition, support pins 112 support diffuser panel 106 and luminance-equalizing sheet 107. FIG. 4 is a schematic cross-sectional view of a state in which support pin 112 attached to back frame 111 inside liquid crystal module 100 supports diffuser panel 106 and luminance-equalizing sheet 107. In this regard, however, among the components of liquid crystal module 100, those unnecessary for the illustration are omitted from FIG. 4.

Luminance-equalizing sheet 107 includes, in positions corresponding to respective support pins 112 attached to back frame 111, holes into which support pins 112 are inserted. After tip 112A of support pin 112 is inserted into the hole, luminance-equalizing sheet 107 is supported by flange 112B of support pin 112 as shown in FIG. 4.

It should be noted that support pin 112 may support luminance-equalizing sheet 107 in a position at a distance from LED 113 on back frame 111 which is determined in design, and this supporting configuration is not limited to flange 112B that is flanged. For example, support pin 112 may include a portion like a pedestal having a top surface instead of flange 112B, and support luminance-equalizing sheet 107 with the top surface of the portion. Alternatively, support pin 112 may include a portion that gets thicker from the front to back of liquid crystal module 100 as installed, and support luminance-equalizing sheet 107 at a location where the portion and the hole of luminance-equalizing sheet 107 fit in diameter.

Diffuser panel 106 is supported by an end of side wall 111B of back frame 111 in a periphery, and is supported by tip 112A of support pin 112 standing on flat portion 111A of back frame 111 in a portion other than the periphery as shown in FIG. 4.

Such support pins 112 are spaced substantially equally, for example, in a matrix in flat portion 111A so that support pins 112 support the entirety of diffuser panel 106 and luminance-equalizing sheet 107. In addition, support pins 112 are arranged in positions away from respective LEDs 113, e.g. on lines passing through equidistant points between horizontally or vertically adjacent two of LEDs 113, in order that support pins 112 do not block light toward luminance-equalizing sheet 107 as much as possible.

The following describes a configuration of liquid crystal module 100 for further increasing luminance uniformity throughout the screen, in such image display apparatus 10 according to the present disclosure.

Embodiment

Figure 5:
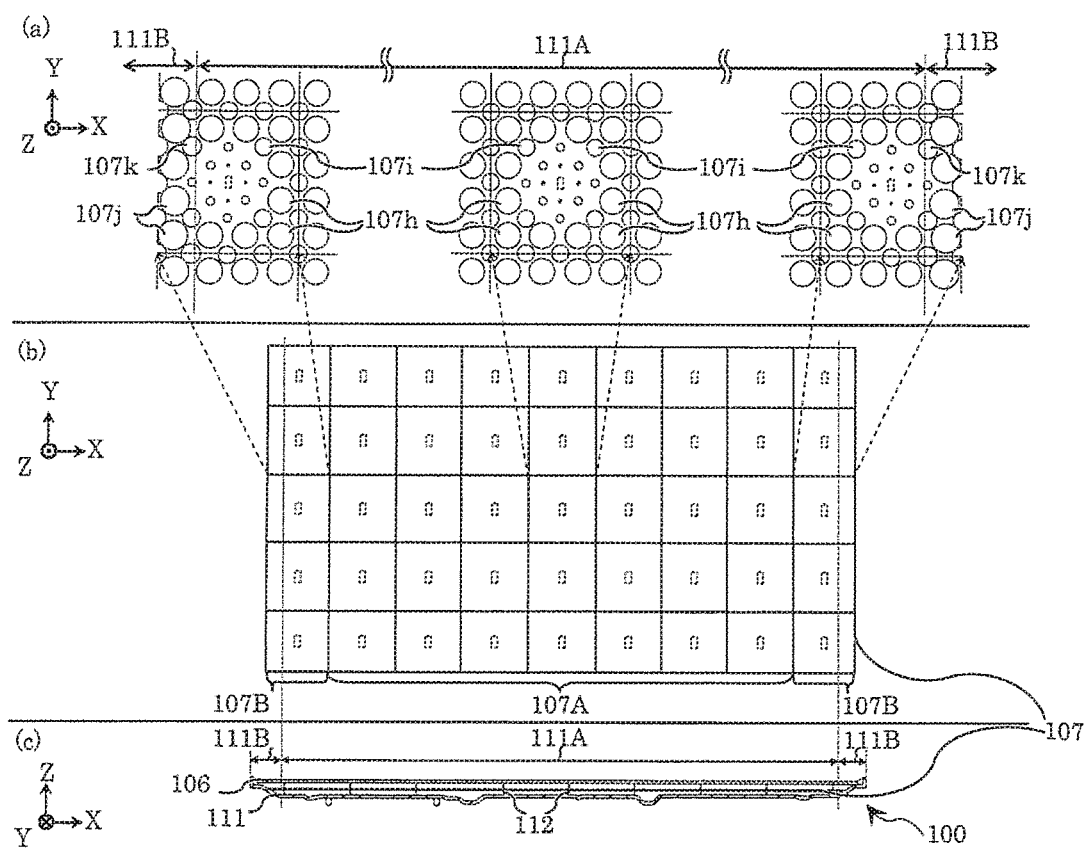
FIG. 5 is a schematic cross-sectional view of an example of a configuration of the liquid crystal module.

FIG. 5 is a schematic diagram for describing, using an example, a configuration of liquid crystal module 100 according to the embodiment.

More specifically, (a) is an enlarged front view of three blocks among the blocks of luminance-equalizing sheet 107.

(b) is a schematic front view of entire luminance-equalizing sheet 107. As stated above, the boundaries of the rectangular blocks arranged in the array in luminance-equalizing sheet 107 are indicated by the virtual lines. Arrows extending from (b) to (a) indicate a correspondence relationship between positions in the overall view shown in (b) and positions in the enlarged view shown in (a).

Dashed rectangles in (a) and (b) show the positions of LEDs 113 in flat portion 111A in a front view. Each of the blocks faces a different one of LEDs 113 in flat portion 111A of back frame 111.

(c) is a view of a cross section of liquid crystal module 100, which is parallel to xz plane, when seen perpendicularly to the bottom surface of liquid crystal module 100.

Two broken lines extending from (b) to (c) indicate positions corresponding to boundaries between flat portion 111A and side walls 111B of back frame 111. The positions are also indicated by broken lines having an identical appearance in the enlarged view of (a).

Hereinafter, a configuration of liquid crystal module 100 according to the present embodiment will be described with a focus on luminance-equalizing sheet 107 with reference to FIG. 5.

Circles shown in (a) in FIG. 5 indicate openings of through holes in luminance-equalizing sheet 107. Openings 107$h$, 107$i$, 107$j$, and 107$k$ are openings of through holes used as an example in the following description. The same reference signs are given to openings having the same size. It should be noted that the openings of these through holes are not shown in (b).

The through holes are arranged in predetermined patterns applied to the respective blocks. In the present embodiment, the predetermined patterns used in single luminance-equalizing sheet 107 include different patterns. The patterns applied to the respective blocks differ depending on the positions of the blocks in the array of the blocks. More specifically, in the example shown in FIG. 5, different patterns are applied to blocks in the leftmost and rightmost columns of the array of the blocks, and blocks in columns between the leftmost and rightmost columns. Here, each of the blocks in the leftmost and rightmost columns is referred to as block 107B, and each of the blocks in the columns between the leftmost and rightmost columns is referred to as block 107A. Thus, the three blocks shown in (a) are block 107B, block 107A, and block 107B from left to right in listed order. Block 107B is an example of an outer block to be described in the present embodiment.

As shown in (a), in block 107A to which one of the predetermined patterns is applied, the through holes have a substantially larger opening area with distance from LED 113 that block 107A faces. For example, both openings 107$h$ and openings 107$i$ are larger than openings of through holes closer to LED 113 at a position overlapping the center of block 107A. Further, a comparison of openings 107$h$ and openings 107$i$ shows that openings 107$h$ of the through holes farther from LED 113 are larger than openings 107$i$.

In luminance-equalizing sheet 107, light transmittance varies according to an opening area per unit area (hereinafter referred to as an opening proportion). The unit area here can be determined as being smaller than the area of one entire block and larger than the opening area of the largest through hole. As stated above, by varying the opening areas of through holes in one block, the opening proportion in the block can be made different by location. With this, the transmittance of emitted light in block 107A is adjusted to be lower in a location closer to LED 113 and higher in a location farther from LED 113. As a result, it is possible to make the luminance of light passed through luminance-equalizing sheet 107 to display panel 102 spatially uniform as much as possible in block 107A.

In contrast, in block 107B to which another of the predetermined patterns is applied, there is a tendency for the through holes to have a substantially larger opening area with distance from LED 113 that block 107B faces. For example, a comparison of openings 107$h$ and openings 107$i$ shows that openings 107$h$ of the through holes farther from LED 113 are larger than openings 107$i$. Similarly, a comparison of openings 107$j$ and openings 107$k$ shows that openings 107$j$ of the through holes farther from LED 113 are larger than openings 107$k$.

Moreover, through holes closer to the periphery of the array of the blocks have a larger opening area than through holes farther from the periphery even if the through holes are at substantially the same distance from LED 113. For example, a comparison of openings 107$h$ and openings 107$j$ shows that openings 107$j$ of the through holes farther from LED 113 are larger than openings 107$h$. Similarly, a comparison of openings 107$i$ and openings 107$k$ shows that openings 107$k$ of the through holes farther from LED 113 are larger than openings 107$i$.

Such differences in areas of the openings of the through holes are made to both left and right blocks 107B of luminance-equalizing sheet 107. It should be noted that in this example, there is an approximately 10% difference in diameter between openings 107$h$ and openings 107$j$ as well as openings 107$i$ and openings 107$k$.

With this, the transmittance of emitted light in block 107B is adjusted to be lower in a location closer to LED 113 and higher in a location farther from LED 113, and the luminance of light passed through display panel 102 can be made spatially uniform as much as possible. Moreover, at a location which is closer to an end of display panel 102 and onto which no light from LED 113 facing an adjacent block is incident, transmittance is adjusted to be higher than at a location farther from the end of display panel 102 even if the locations are at the same distance from LED 113. As a result, it is possible to increase spatial uniformity of the luminance of light passed through luminance-equalizing sheet 107 toward display panel 102 in block 107B.

It should be noted that providing through holes having different opening areas in one block is an example of through holes provided to achieve opening proportions in the block. Examples of the through holes to be provided to achieve such varied opening proportions include through holes having the same opening area (a distance between the centers of openings) at varied densities in a block, and through holes having different opening areas at varied densities in a block. The shape of the openings is not limited to a circle as shown in FIG. 5, and may be a slit or any shape such as a polygon.

Even when the through holes are any one of those, in block 107A to which the above pattern is applied, there is a positive correlation between the opening proportion of luminance-equalizing sheet 107 due to the through holes and the distance from LED 113 that block 107A faces. Hereinafter, this pattern is also referred to as a second pattern. Further, in block 107B to which the above pattern is applied, there is a positive correlation between the opening proportion of luminance-equalizing sheet 107 due to the through holes and the distance from LED 113 that block 107B faces, and there is a negative correlation between the opening proportion and the distance from the periphery of the array of the blocks. Hereinafter, this pattern is also referred to as a first pattern.

The first pattern and the second pattern relating to the arrangement of the through holes have been described thus far using, as an example, some of the blocks arranged in the array in luminance-equalizing sheet 107. Next, the following describes positions or ranges of blocks to which the respective patterns are applied, in the array. It should be noted that the following description assumes that blocks are arranged in a rectangular array in which the blocks are arranged in at least three rows and at least three columns.

The first pattern is applied to, among the blocks, at least some of outer blocks that are in contact with the periphery of the array. For example, the first pattern may be applied to all blocks 107B included in the leftmost and rightmost columns of the array. The second pattern may be applied to all blocks to which the first pattern is not applied, that is, all blocks 107A shown in FIG. 5. When the first pattern and the second pattern are applied to the blocks in such a manner, luminance-equalizing sheet 107 can be manufactured without decreasing efficiency compared to a conventional luminance-equalizing sheet, by using a mold that can make holes for one or more rows at one time and passing on a resin sheet to be luminance-equalizing sheet 107 in a direction (Y axis direction) along the short side.

The luminance unevenness resulting from the luminance decreasing toward the ends of the screen in the vicinity of the ends also occurs in the upper and lower portions of the screen. In order to reduce such luminance unevenness, the first pattern may be applied to all blocks included in the uppermost row and the lowermost row of the array. The blocks included in these rows are also outer blocks. When the first pattern is applied to all the blocks included in the uppermost row and the lowermost row of the array, and the second pattern is applied to blocks included in rows between those rows, for example, luminance-equalizing sheet 107 can be manufactured without decreasing efficiency compared to a conventional method, by using a mold that can make holes for at least each row and passing on a resin sheet to be luminance-equalizing sheet 107 in a direction (X axis direction) along the long side.

It can be said that the above-described blocks to which the first pattern is applied are outer blocks in contact with one of opposite sides of the perimeter of a rectangle formed by the array.

Figure 6:
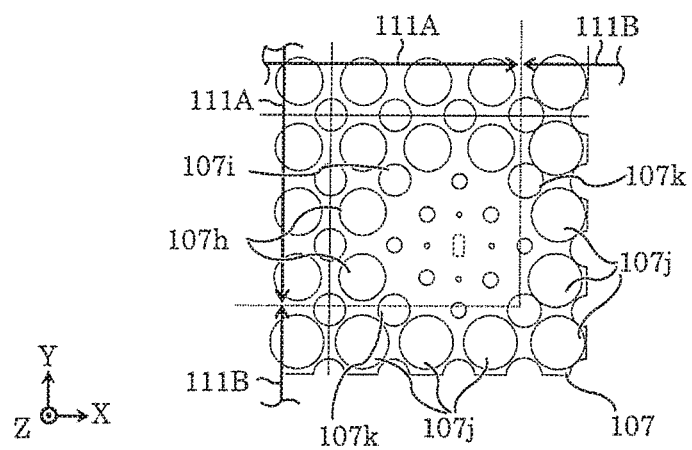
FIG. 6 is a schematic diagram showing an example of openings in an outer block at a corner of the liquid crystal module when a first pattern is applied to all outer blocks.

The first pattern may be applied to outer blocks in contact with any of the four sides of the rectangle, that is, all outer blocks, and the second pattern may be applied to inner blocks that are not in contact with the periphery of the array. With this, luminance decrease in the vicinity of all the ends of the screen is reduced. FIG. 6 shows the openings of through holes in an outer block at a corner of the array for this case. FIG. 6 is a schematic diagram showing an example of the openings of through holes in an outer block at the right bottom corner of the array in a front view when the first pattern is applied to all the outer blocks. What are indicated by the various lines and arrows are the same as those in (a) in FIG. 5. In FIG. 6, the right side and lower side of this outer block are in contact with the periphery of the array. Further, openings 107j and 107k of through holes closer to the periphery are larger than openings 107j and 107i of through holes farther from the periphery and having the same distance from LED 113 as the former through holes.

Moreover, the second pattern may be applied to only some of the inner blocks, and the first pattern may be applied to the other inner blocks. For example, when rise in luminance in each of the blocks is significantly affected by another block, the first pattern may also be applied to the inner blocks in contact with the outer blocks. In other words, even in an inner block in contact with an outer block, there are a positive correlation between the opening proportion of luminance-equalizing sheet 107 due to through holes and a distance from LED 113 that the inner block faces, and a negative correlation between the opening proportion and a distance from the periphery of the array. If light from much farther blocks has such an effect, the first pattern may be also applied to inner blocks much farther from the periphery of the array.

As stated above, the first pattern is applied to, among the blocks, at least some of the outer blocks that are in contact with the periphery of the arrangement. Moreover, the first pattern may be also applied to some of the inner blocks in addition to some or all of the outer blocks. Furthermore, the second pattern is applied to blocks to which the first pattern is not applied, and more specifically, the second pattern is applied to at least some of the inner blocks. In addition, when the first pattern is applied to only some of the outer blocks, the second pattern is also applied to outer blocks to which the first pattern is not applied in addition to the inner blocks.

It should be noted that although the positions or ranges of the blocks to which the respective patterns thus described are applied are assumed to be the rectangular array in which the blocks are arranged in at least three rows and at least three columns, the patterns can be applied in accordance with the same idea even when an array has a different size or shape.

For example, in an array having less than three rows or columns of blocks, all the blocks are outer blocks in contact with the periphery of the array, and there are no inner blocks. In this case, the first pattern may be applied to all the blocks. When the number of one of rows and columns is less than three but the number of the other one is three or more, the first pattern may be applied to only rows or columns at the both longitudinal ends of the array.

When, for example, the shape of the periphery of an array is not a rectangle, assuming that blocks in contact with the periphery are outer blocks and blocks not in contact with the periphery are inner blocks, each pattern can be applied. Moreover, when it cannot be said that blocks are arranged in rows and columns in a strict sense, such as a staggered array, each pattern can be applied by the same token. Furthermore, although the shape of each block in the example shown in the figure is a rectangle, the present embodiment can be applied to a shape other than the rectangle, blocks having a tessellable shape such as a triangle or a hexagon, and an array having a shape formed by such blocks.

(Advantageous Effect)

Figure 7:
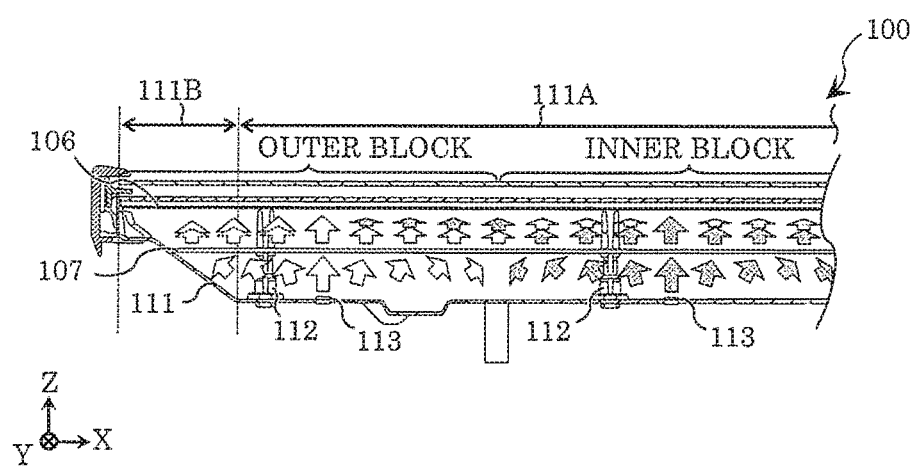
FIG. 7 is a fragmentary sectional view schematically showing a state of a portion of the cross section of the liquid crystal module seen perpendicularly to the bottom surface of the liquid crystal module.

The following describes an advantageous effect of reducing luminance unevenness in the end portion of a screen, which is produced by the first pattern being applied to the outer blocks of luminance-equalizing sheet 107, with reference to a figure. FIG. 7 is a fragmentary sectional view schematically showing a state in which a portion of the cross section of liquid crystal module 100 parallel to the xz plane is seen perpendicularly to the bottom surface of liquid crystal module 100.

In FIG. 7, directions and lengths of arrows in liquid crystal module 100 indicate traveling directions and intensities (luminance) of light, respectively. Further, different patterns of the arrows indicate different LEDs 113 that emit the light. It should be noted that light crossing the border between the blocks before entering luminance-equalizing sheet 107 is omitted from the figure for the sake of visibility.

As stated above, in luminance-equalizing sheet 107, the light transmittance varies by location. First, a difference in transmittance in each block will be described. The difference is common to outer blocks and inner blocks. See only the arrows with solid outlines.

In each block, emitted light from LED 113 is most intense directly above LED 113 and is attenuated with distance from LED 113. The transmittance of luminance-equalizing sheet 107 is lowest in a vicinity directly above LED 113 and the lengths of the arrows indicating the intensities of light significantly differ on the opposite sides of luminance-equalizing sheet 107 such that the differences in intensities of such light by location are reduced after the light passes through luminance-equalizing sheet 107.

In contrast, the transmittance increases with distance from LED 113, and differences in the lengths of the arrows on the opposite sides of luminance-equalizing sheet 107 are smaller compared to the vicinity directly above LED 113.

Moreover, the transmittance is adjusted in view of the intensities of light from adjacent blocks, such that differences in intensities of light passed through luminance-equalizing sheet 107 by location are made small as much as possible As indicated by differences in height of the tips of arrows above luminance-equalizing sheet 107 (height of the tips of upper arrows when two arrows are arranged up and down) being small, the differences in intensities of the passed light by location are reduced.

Next, an outer block and an inner block to which the second pattern is applied are compared in terms of a distribution of transmittance.

In the inner block, the transmittance symmetrically varies on the opposite sides of a vicinity directly above LED 113.

In contrast, in the outer block to which the first pattern is applied, the transmittance varies in a portion between a vicinity directly above LED 113 and an adjacent block, in the same manner as the inner block. On the other hand, the transmittance is higher in a portion between the vicinity directly above LED 113 and the periphery of an array with an increase in distance from the periphery. Accordingly, light entering luminance-equalizing sheet 107 is weaker at a location with a decrease in distance from the periphery, but a difference in light passed through luminance-equalizing sheet 107 is small between even a location close to the periphery and the vicinity directly above LED 113. In addition, the transmittance asymmetrically varies on the opposite sides of the vicinity directly above LED 113.

Here, a transmittance when the first pattern is applied to the outer block and a transmittance when the second pattern is applied to the outer block are compared. The arrows wish dashed outlines indicate light passed through luminance-equalizing sheet 107 in the vicinity of the periphery of the array, in the outer block to which the second pattern, that is, a pattern common to the inner block is applied. A difference in length between the arrows with dashed outlines and the arrows with solid outlines is a difference in luminance at this location.

As described above, in luminance-equalizing sheet 107 according to the present embodiment, the transmittance varies according to the intensity of the incident light that varies by location or, more specifically, so as to have the negative correlation with the intensity of the incident light, in order to further increase a degree of uniformity in the luminance of the passed light. The variation of the transmittance is achieved by varying the opening proportion due to the through holes provided to transmit light. The through holes are arranged in a pattern for each block facing a different one of the light sources. Moreover, since the intensity of incident light at each location varies due to not only a distance from LED 113 that is a light source but also whether adjacent blocks are present, distributions of intensity of incident light in the blocks are different depending on locations on luminance-equalizing sheet 107. In order to address the differences in the distributions of the intensities of the incident light, in luminance-equalizing sheet 107 in the present embodiment, a different one of the through hole arrangement patterns is applied to each block depending on whether the block is in contact with the periphery of an array.

Besides, the through hole arrangement pattern to be applied to each block may be determined by also considering the presence or absence of influence of light from LED 113 facing a block separated by at least one block.

In addition, the manufacturing efficiency of the luminance-equalizing sheet may be further considered. Manufacturing of luminance-equalizing sheet 107 may be enabled by merely changing a mold used for manufacturing conventional luminance-equalizing sheets with a different mold for the patterns, depending on which blocks are selected as the ones to which the first pattern is to be applied.

Image display apparatus 10 that includes liquid crystal module 100 including luminance-equalizing sheet 107 is capable of displaying an image with greater luminance uniformity across a region continuous from the center to periphery of the screen. Even though the thickness of entire liquid crystal module 100 is, for example, substantially even, liquid crystal module 100 can reduce the luminance unevenness of the entire screen by absorbing differences in intensities of light from a direct-lit backlight by location within the screen. Although such differences in intensities of light have been conventionally reduced by blocking of light by ink applied to a diffuser panel in a predetermined pattern by printing, a printing step from applying to drying the ink can be omitted from the manufacturing process for liquid crystal module 100, by using luminance-equalizing sheet 107 that can be manufactured with approximately the same efficiency as before, and the reduction of manufacturing cost is expected.

Moreover, in liquid crystal module 100 that becomes thinner toward the end portion, the shape of the back frame is likely to increase unevenness of the luminance of light entering luminance-equalizing sheet 107 between the center and periphery of the screen. In this case also, luminance-equalizing sheet 107 can reduce the luminance unevenness of the entire screen by optimizing individual through hole arrangement patterns to be applied to respective blocks.

Variation of Embodiment

In the above embodiment, the luminance unevenness of the entire screen is reduced by the design idea about the through hole arrangement patterns. However, even with luminance-equalizing sheet 107 having the same number and types of the through hole arrangement patterns, there are cases where a similar luminance reduction effect cannot be produced among liquid crystal modules. This is because LEDs, which are light sources, have different light distribution characteristics due to differences in internal structure etc. among models of LEDs.

Figure 8A:
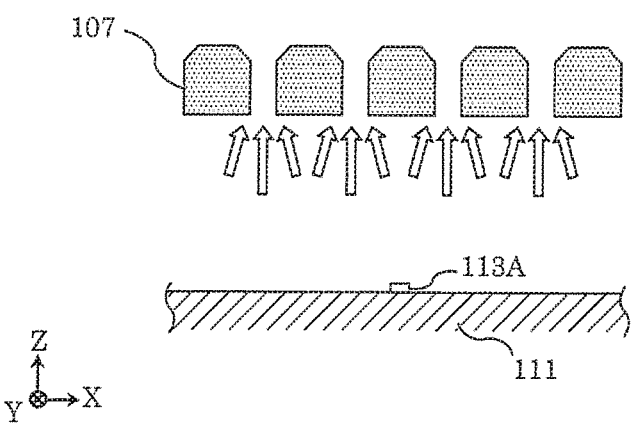
FIG. 8A is a schematic fragmentary sectional view of the liquid crystal module, for describing a configuration of a luminance-equalizing sheet according to a variation of the embodiment.
Figure 8B:
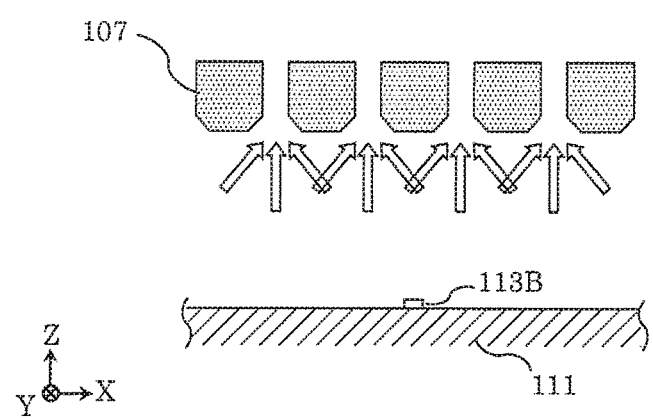
FIG. 8B is a schematic fragmentary sectional view of the liquid crystal module, for describing a configuration of the luminance-equalizing sheet according to the variation of the embodiment.

In view of this, the inventors have found a configuration that produces a more powerful luminance unevenness reduction effect by absorbing, in some degree, differences in light distribution characteristics among light sources by taking advantage of shape characteristics of through holes provided to luminance-equalizing sheet 107 using the mold as described above. The following describes this configuration with reference to FIGS. 8A and 8B. FIGS. 8A and 8B each are a schematic fragmentary sectional view of the liquid crystal module, for describing a configuration of luminance-equalizing sheet 100 according to a variation of the embodiment.

Back frame 111 includes LED 113A in FIG. 8A, and back frame 111 includes LED 113B in FIG. 8B. It should be noted that LED 113A and LED 113B differ in light distribution characteristics. More specifically, in LED 113A, out of emitted light, light travelling straight (in a direction along the Z axis) is strong and has a huge difference in strength from light travelling diagonally or laterally. In LED 113B, out of emitted light, light travelling straight is strongest but has a small difference in strength from light traveling diagonally or laterally. The directions and lengths of arrows in FIG. 8A and FIG. 8B indicate the traveling directions and intensities of representative emitted light, respectively.

In the present variation, luminance evenness is increased by absorbing the difference in light distribution characteristics using shear droops in luminance-equalizing sheet 107. The shear droops are formed by making through holes in luminance-equalizing sheet 107 with a mold.

Specifically, a surface with the shear droops is directed to a side opposite to a light source having light distribution characteristics like LED 113A. Since the emitted light from LED 113A contains a large amount of substantially straight light, in such a configuration, light that cannot pass through the through holes by being blocked by luminance-equalizing sheet 107 is relatively little. In addition, since light traveling toward diffuser panel 106 is diffusely emitted from the surface with the shear droops, it is easy to equalize the luminance.

Moreover, the surface with the shear droops is directed to a light source having light distribution characteristics like LED 113B. Relatively strong light diffusely emitted from the light source can pass through wider openings to luminance-equalizing sheet 107 due to the shear droops, and is not easily blocked by luminance-equalizing sheet 107. In other words, luminance-equalizing sheet 107 having such a configuration can transmit more light and, as a result, allows more light to pass through than luminance-equalizing sheet 107 having the configuration shown in FIG. 8A.

As above, it is possible to increase the light transmittance of entire luminance-equalizing sheet 107 by switching the two sides of luminance-equalizing sheet 107 in accordance with the light distribution characteristics of the light source. The configurations in the present variation allow the use of luminance-equalizing sheet 107 in the above embodiment in accordance with the light distribution characteristics of the light source so as to produce the more powerful luminance unevenness reduction effect.

Furthermore, since such configurations can be achieved by merely switching the two sides of one type of luminance-equalizing sheet 107, the configurations can give a manufacturing cost advantage over preparing different types of luminance-equalizing sheets in accordance with the light distribution characteristics of the light source.

In addition, one type of luminance-equalizing sheet 107 can adjust to light sources having different light distribution characteristics, and thus it is possible to increase the number of choices for light sources.

Other Embodiments

As described above, the embodiment has been given as examples of the techniques disclosed in the present application. However, the techniques disclosed in the present application are not limited to these examples, and are also applicable to embodiments as a result of appropriate modification, replacement, addition, and omission, for instance.

For example, although LEDs 113 have been described as the light sources above, the embodiment and the variation are also applicable to image display apparatuses using a direct-lit backlight system which includes light sources other than LEDs. Examples of the light sources other than the LEDs included in the image display apparatuses to which the embodiment and the variation are applied include a cold-cathode tube and a fluorescent tube.

Moreover, although image display apparatus 10 has been described as, for example, a liquid crystal television, other examples of such include a monitor for personal computers and a display for digital signage.

Moreover, the components described in the embodiment and the variation can be combined to create a new embodiment.

Moreover, the embodiment and the variation described above are intended to illustrate the techniques in the present application, and thus various modifications, replacements, addition, omissions, etc. may be made within the scope of claims and the equivalents thereof.

INDUSTRIAL APPLICABILITY

The present disclosure is applicable to image display apparatuses that look thin in appearance by reducing the thickness of a peripheral portion more than the thickness of other portions. More specifically, the present disclosure is applicable to television receivers, monitors, displays for digital signage, etc.

The invention claimed is:
1. An image display apparatus, comprising:
a display panel;
a back frame that includes a flat portion having a substantially flat surface and a side surface extending from an edge of the flat surface, the flat portion and the side surface facing an active area of the display panel;
a plurality of light sources that are spaced substantially evenly apart from each other, and disposed on the flat portion; and
a luminance-equalizing sheet that is sheet-shaped and supported at a distance from the plurality of light sources by a plurality of support pins, the plurality of support pins being pillar-shaped, spaced substantially evenly apart from each other, and disposed on the flat portion, the luminance-equalizing sheet overlapping the flat surface and the side surface of the back frame when viewed from the display panel,
wherein the luminance-equalizing sheet includes a plurality of through holes that transmit light from the plurality of light sources toward the display panel,
the plurality of through holes are arranged in a predetermined pattern that is applied to blocks that are arranged in an array in the luminance-equalizing sheet and each of which faces a different one of the plurality of light sources, the predetermined pattern includes a first pattern and a second pattern, the first pattern being applied to at least some of outer blocks, among the blocks, that are in contact with a periphery of the array, the second pattern being different from the first pattern and applied to at least some of the blocks to which the first pattern is not applied, and the at least some of the outer blocks each have a side corresponding to an edge of the luminance-equalizing sheet, the side overlapping the side surface of the back frame when viewed from the display panel, the side having first through holes aligned in line with the edge of the luminance-equalizing sheet, each of the first through holes having an opening area greater than that of the plurality of through holes other than the first through holes.

2. The image display apparatus according to claim 1, wherein in the at least some of the outer blocks to which the first pattern is applied, an opening proportion of the luminance-equalizing sheet due to the plurality of through holes has a positive correlation with a distance from, among the plurality of light sources, light sources that the at least some of the outer blocks face, and the opening proportion has a negative correlation with a distance from the periphery of the array.

3. The image display apparatus according to claim 1, wherein in the array, the blocks are arranged in at least three rows and at least three columns, the periphery of the array is a rectangle, and the first pattern is applied to the at least some of the outer blocks that are in contact with any one of a pair of opposing sides of the rectangle.

4. The image display apparatus according to claim 3, wherein the first pattern is applied to the at least some of the outer blocks that are in contact with any one of four sides of the rectangle.

5. The image display apparatus according to claim 2, wherein the second pattern is applied to at least some of inner blocks, among the blocks, that are not in contact with the periphery of the array, and in the at least some of the inner blocks to which the second pattern is applied, an opening proportion of the luminance-equalizing sheet due to the plurality of through holes has a positive correlation with a distance from, among the plurality of light sources, light sources that the at least some of the inner blocks face.

6. The image display apparatus according to claim 2, wherein at least one of density and opening area of the plurality of through holes varies in each of the blocks.

7. An image display apparatus, comprising:

a display panel;

a back frame that includes a flat portion having a substantially flat surface and a side surface extending from an edge of the flat surface, the flat portion and the side surface facing an active area of the display panel;

a plurality of light sources that are spaced substantially evenly apart from each other, and disposed on the flat portion; and a luminance-equalizing sheet that is sheet-shaped and supported at a distance from the plurality of light sources by a plurality of support pins, the plurality of support pins being pillar-shaped, spaced substantially evenly apart from each other, and disposed on the flat portion, the luminance-equalizing sheet overlapping the flat surface and the side surface of the back frame when viewed from the display panel, wherein the luminance-equalizing sheet includes a plurality of through holes that transmit light from the plurality of light sources toward the display panel, the plurality of through holes are arranged in a predetermined pattern that is applied to blocks that are arranged in an array in the luminance-equalizing sheet and each of which faces a different one of the plurality of light sources, the predetermined pattern includes a first pattern and a second pattern, the first pattern being applied to at least some of outer blocks, among the blocks, that are in contact with a periphery of the array, the second pattern being different from the first pattern and applied to at least some of the blocks to which the first pattern is not applied, and in each of the blocks to which the first pattern or the second pattern is applied, the plurality of through holes have a same opening area and are arranged at varied densities.

* * * * *